US012743672B2

(12) United States Patent
Scheibelhut et al.

(10) Patent No.: US 12,743,672 B2
(45) Date of Patent: Sep. 22, 2026

(54) SMART EXPIRATION DETERMINATION OF GROCERY ITEMS

(71) Applicant: Maplebear Inc., San Francisco, CA (US)

(72) Inventors: Brent Scheibelhut, Toronto (CA); Shaun Maharaj, Vaughn (CA)

(73) Assignee: Maplebear Inc., San Francisco, CA (US)

(*) Notice: Subject to any disclaimer, the term of this patent is extended or adjusted under 35 U.S.C. 154(b) by 137 days.

(21) Appl. No.: 17/955,415

(22) Filed: Sep. 28, 2022

(65) Prior Publication Data

US 2024/0104494 A1 Mar. 28, 2024

(51) Int. Cl.

| | |
|---|---|
| ***G06Q 10/087*** | (2023.01) |
| ***G06V 10/774*** | (2022.01) |
| ***G06V 10/776*** | (2022.01) |
| ***G06V 10/82*** | (2022.01) |
| ***G06V 20/68*** | (2022.01) |

(52) U.S. Cl.

CPC ......... *G06Q 10/087* (2013.01); *G06V 10/774* (2022.01); *G06V 10/776* (2022.01); *G06V 10/82* (2022.01); *G06V 20/68* (2022.01)

(58) Field of Classification Search

CPC .... G06Q 10/087; G06V 10/82; G06V 10/774; G06V 10/776

USPC .............................................................. 705/28

See application file for complete search history.

(56) References Cited

U.S. PATENT DOCUMENTS

2019/0272557 A1 9/2019 Smith et al.
2019/0304079 A1 10/2019 Min et al.
2020/0074402 A1* 3/2020 Adato .................... G06V 20/52
2020/0250531 A1* 8/2020 Rai .................... G06Q 10/0832
2020/0342366 A1* 10/2020 Nishida .................. G06N 20/00

FOREIGN PATENT DOCUMENTS

CN 112098596 A * 12/2020 ............. G06N 3/044
WO WO-2022081518 A2 * 4/2022 ........... G06Q 10/087

OTHER PUBLICATIONS

PCT International Search Report and Written Opinion, PCT Application No. PCT/US2023/28583, Nov. 8, 2023, 9 pages.

* cited by examiner

*Primary Examiner* — Luna Champagne
(74) *Attorney, Agent, or Firm* — Fenwick & West LLP

(57) ABSTRACT

An online concierge system may receive multi-angle images of a plurality of instances of a grocery item carried at a physical store. Each instance of the grocery item is associated with one or more multi-angle images that are captured through a checkout process of the instance of the grocery item. The online concierge system may apply a machine learning model to the multi-angle images to identify expiration information of the plurality of instances of the grocery item. The online concierge system may use the identified expiration information to predict that a batch of the grocery item remaining in inventory of the physical store is close to expiration. The online concierge system may generate one or more item-specific suggestions associated with the expiration information with respect to the grocery item offered in the physical store.

16 Claims, 7 Drawing Sheets

SMART EXPIRATION DETERMINATION OF GROCERY ITEMS

BACKGROUND

Delivering accurate, relevant and sometimes user-tailored data to users is often a challenging task for any online system, particularly ones with large databases. In some cases, a database may include various data entries that are fast changing. The various changes in the databases may affect how a user interacts with a system. In some cases, a data entry may be associated with a real-world object that has a temporal nature. For example, in an inventory management system, an entry for an inventory item may be associated with timing information for an expiring item. Determining the nature of the real-world object is often challenging for a conventional computing system. The failure to provide accurate timing information concerning various real-world objects often adversely affects the user experience of an online system.

SUMMARY

In accordance with one or more aspects of the disclosure, a process for determining the expiration information of a grocery item is described. An online system may receive multi-angle images of different instances of a grocery item that is carried (e.g., in stock, sold, and/or otherwise made available for purchase) at a physical store. The images may be captured during a checkout process of the corresponding instance of the grocery item. For example, the grocery item may be placed on a shopping carrier that is equipped with one or more cameras. The grocery item may also be scanned at a checkout counter that is equipped with one or more cameras. As the images are captured, the online system may apply a machine learning model to the images to identify the expiration information of the instance of the grocery item. The online system may repeat the process for additional instances of the grocery item. In response to determining that the expiration information of various instances of the grocery item indicates that the grocery item is close to expiration, the online system may predict that the batch of the grocery item remaining in the inventory of the physical store is also close to expiration.

Based on the expiration information, the online system may perform one or more item-specific suggestions with respect to the grocery item. For example, the online system may provide a notification to customers that the grocery item at the physical store is about to expire. The online system may offer a discount to reduce food waste. In some embodiments, the online system may also suggest a substitute item to replace the item that is about to expire. By tracking the temporal information of the grocery item, the online system may also provide prediction as to the re-stocking of the grocery item and freshness of the item. If the online system predicts that the grocery item has just been re-stocked, the online system may provide a notification that the item is fresh to the customers.

DETAILED DESCRIPTION

Figure 1:
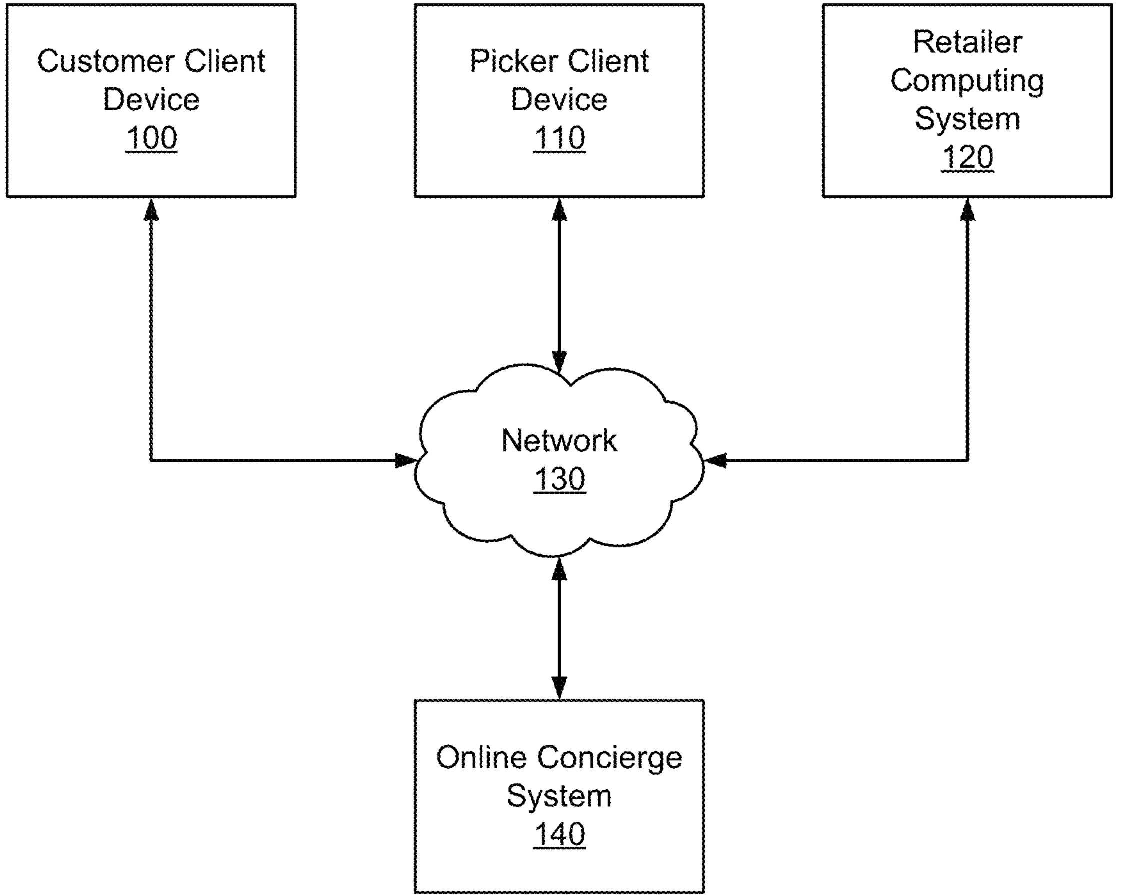
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as “users” of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An “item,” as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a graphical user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a graphical user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the deliver location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provide item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 may also be referred to as an online system or an online server. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customers client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
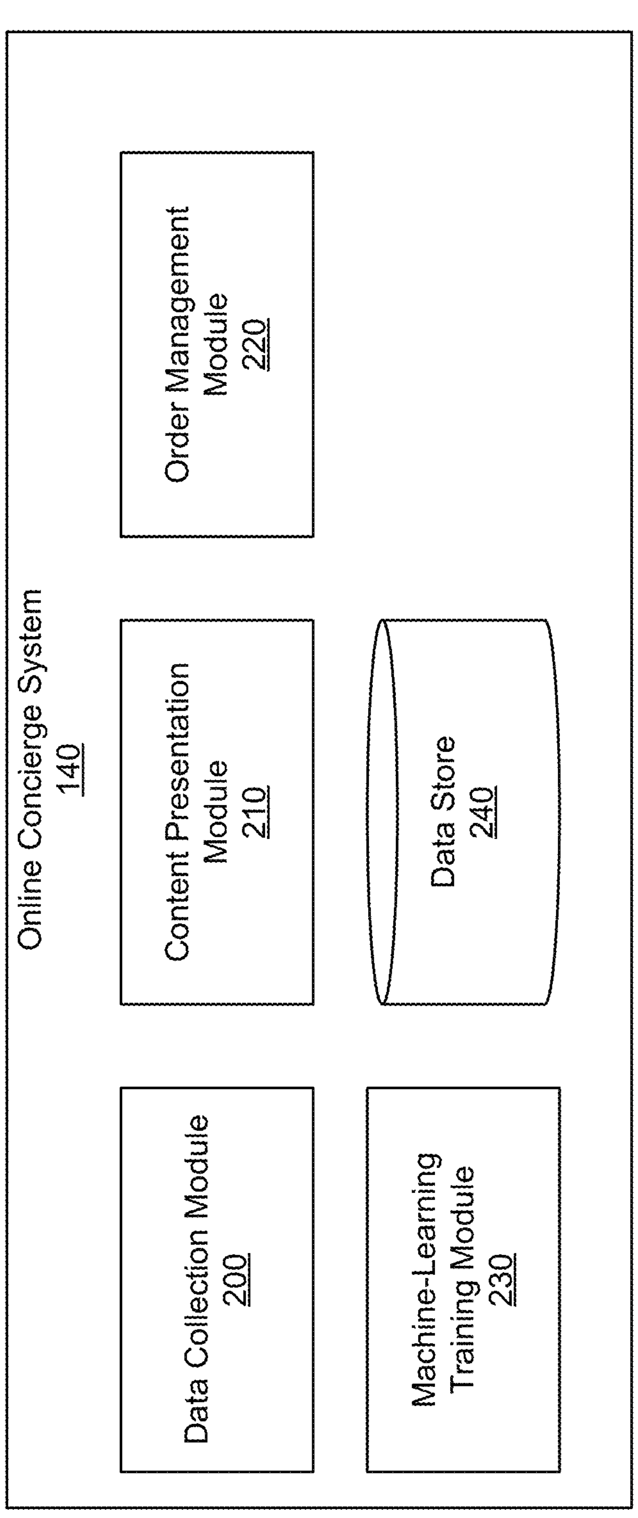
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters. Further detail on training of machine learning models is described in association with FIG. 4.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
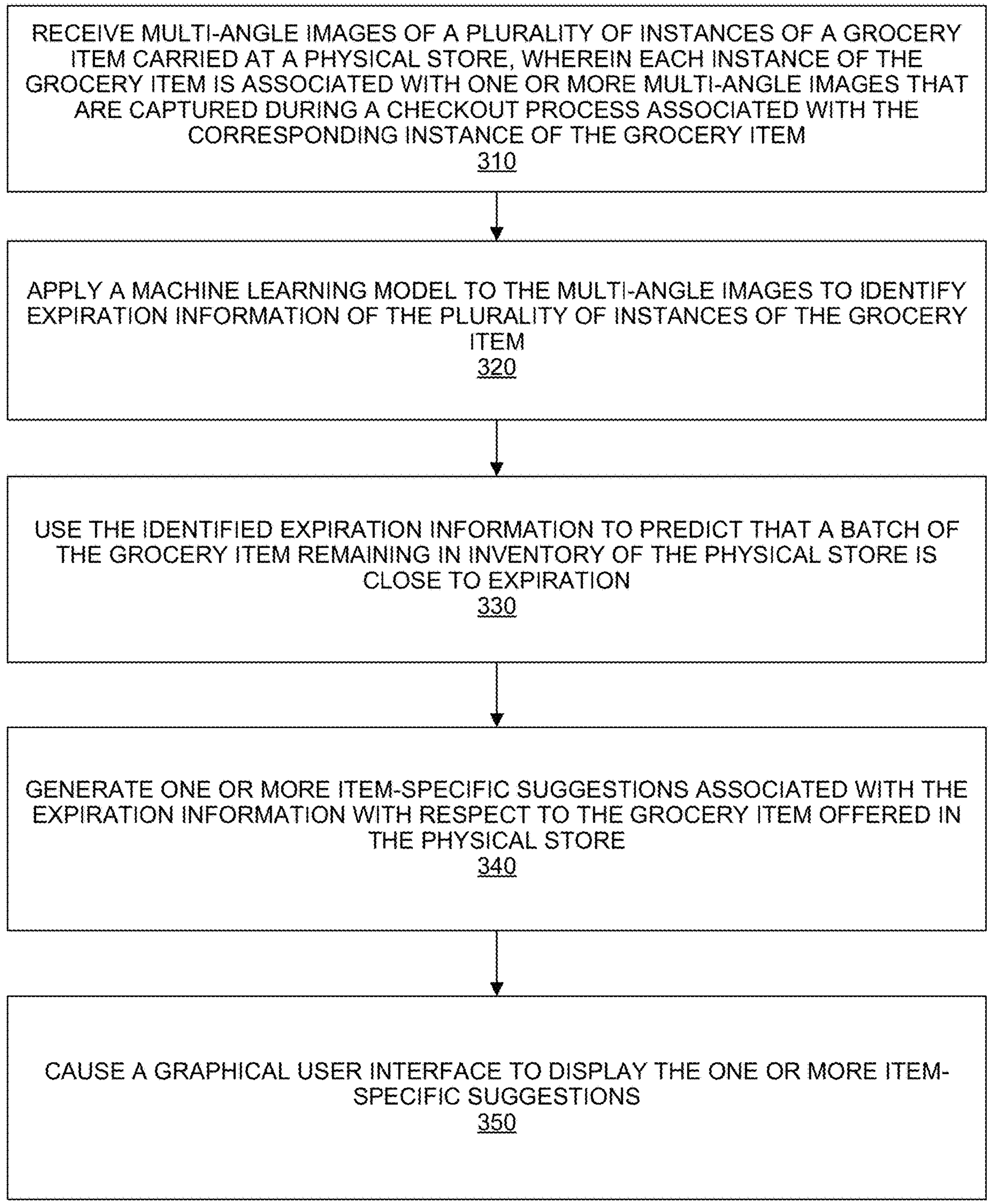
FIG. 3 is a flowchart depicting a process for determining the expiration information of a grocery item, in accordance with one or more embodiments.

FIG. 3 is a flowchart depicting a process 300 for determining the expiration information of a grocery item, in accordance with some embodiments. Alternative embodiments may include more, fewer, or different steps from those illustrated in FIG. 3. The steps may be performed in a different order from that illustrated in FIG. 3. These steps may be performed by an online concierge system (e.g., online concierge system 140). Additionally, each of these steps may be performed automatically by the online concierge system without human intervention.

The online concierge system 140 receives 310 multi-angle images of a plurality of instances of a grocery item carried at a physical store. A physical store may be a retailer location operated by a retailer and be associated with a retailer computing system 120. A physical store may carry one or more batches of the grocery item. Each batch may include multiple instances of the grocery items. A batch may be a collection of the same grocery item that shares the same expiration date. For example, the grocery item may be a particular brand and type of milk (e.g., MooMoo brand, 2% milk) and the batch may include multiple gallons of the milk. Each gallon may be an instance of the grocery item. In some embodiments, while the physical store may have an inventory management system that monitors the level of inventory for each grocery item, the inventory management system may not have the expiration dates for certain items.

The online concierge system 140 may receive multi-angle images of the grocery item as multiple instances of the grocery item are being checked out at the physical store. The online concierge system 140 may collect images of different instances of the same grocery item through the checkout of those instances from different customers and pickers. Each instance of the grocery item may be associated with one or more multi-angle images that are captured during a checkout process of the corresponding instance of the grocery item. The checkout process may include bringing the grocery item from the shelf to the checkout counter and checking out the grocery item at the checkout counter. The checkout process may include having an instance of the grocery item placed in a shopping carrier and scanning the instance of the grocery item at a checkout counter. A shopping carrier may be a shopping cart, a shopping basket, etc. A shopping carrier may be equipped with one or more cameras that capture one or more multi-angle images of the grocery item. Additionally or alternatively, the images of the grocery item may also be captured at the checkout counter when the grocery item is scanned at the counter. In some embodiments, a checkout counter is equipped with one or more cameras that capture one or more of the multi-angle images of the grocery items. U.S. patent application Ser. No. 17/726,385, entitled "System for Item Recognition Using Computer Vision," filed on Apr. 21, 2022, U.S. Pat. No. 11,017,641, entitled "Visual Recognition and Sensor Fusion Weight Detection System and Method" patented on May 25, 2021, and U.S. Patent Publication No. 2020/0151692, entitled "Systems and Methods for Training Data Generation for Object Identification and Self-Checkout Anti-Theft," published on May 14, 2020, describe various example embodiments of how images of grocery items may be captured in a checkout process. All these patent references are incorporated by reference herein for all purposes.

The online concierge system 140 applies 320 a machine learning model to the multi-angle images to identify expiration information of the plurality of instances of the grocery item. In various embodiments, the machine learning model may be a single-stage model or a multi-stage model. In a single-stage model, the images corresponding to an instance of a grocery item may be input into the model. The model is trained to identify the expiration field on the packaging and perform text recognition such as optical character recognition (OCR) to identify the expiration information, such as the expiration date of the grocery item. In some embodiments, the expiration information may take the form of packaging date, import date or another date. For example, the grocery item may expire after a certain period of the packaging date. The model may be trained to distinguish the packaging date from the expiration date. Upon acquiring the expiration information in the form of packaging date, the model may search for information on the package that explains the relationship between packaging and expiration or may automatically calculate the expiration date based on known rules saved in the online concierge system 140.

The model may also be a multi-stage model, which includes multiple models for performing different roles before the expiration date is identified. Some of the models may be rule-based or heuristic models. Other models may be machine learning models such as decision tree models and deep learning models such as a convolutional neural network that is used to recognize text from images. The multi-stage model may be configured to perform the tasks of a single-stage model but may break down the tasks into different stages. For example, a multi-stage model may first identify the grocery item using a first machine learning model (e.g., a first convolutional neural network) based on the item's brand, packaging, placement of various information fields on the packaging, or other relevant information items that are captured in the multi-angle images. The identification of the grocery item may also include using one or more rule-based or decision tree models that categorize the captured image based on item taxonomy that may separate grocery items based on departments, item types, brands, packaging types, etc. After the grocery item is identified, the multi-stage model may in turn use a second model (e.g., a second convolutional neural network) to identify the placement of the expiration information and use image transformation to orient the expiration information. The multi-stage model may include a third model (e.g., a third convolutional neural network) that is trained to perform text recognition such as OCR to identify the expiration information.

In various embodiments, training of a machine learning model may include an iterative process that adjusts the parameters (e.g., the weights, coefficients) of the machine learning model. The training of the machine learning model may include inputting, in forward propagation, training samples of multi-angle images of items with known expiration dates to the machine learning model. The machine learning model may generate predicted expiration dates of the items in the training samples. The training may define an objective function (e.g., a loss function) that compares the predicted expiration dates with the known expiration dates. In each iteration of training, the result of the objective function is determined. The training of the machine learning model may also include adjusting, in backpropagation, parameters of the machine learning model based on the result of the objective function. Further details on the training and the structure of an example machine learning model are discussed in association with FIG. 4.

The online concierge system 140 uses 330 the identified expiration information to predict that a batch of the grocery item remaining in the inventory of the physical store is close to expiration. Depending on the physical store, grocery items of the same type may have the same expiration date or different expiration dates. For example, in one case, the physical store may not bring out new instances of the grocery item until a batch of the item is sold out or almost sold out. In another case, the grocery item may be restocked periodically and multiple batches of the item with different expiration dates may be presented on the shelf. The online concierge system 140 may use a model, such as a rule-based, a heuristic, or a machine learning model to predict whether a batch of the grocery item remaining in the inventory of the physical store is close to expiration.

By way of example, the online concierge system 140 may identify that multiple instances of the grocery item that have been checked out have the same expiration information. As the online concierge system 140 continues to receive images of instances of the grocery item when the instances are checked out by various customers and pickers, the online concierge system 140 determines whether the checked-out instances have the same or similar expiration date. The online concierge system 140 may determine that the number of instances of the grocery items having the same expiration information exceeds a threshold. In turn, the online concierge system 140 may determine that the batch of the grocery item remaining in the inventory of the physical store is close to expiration. The online concierge system 140 may also monitor the number of instances of grocery items whose expiration is not imminent or disagrees with other expiration dates. If the number is high, the online concierge system 140 may determine that the expiration prediction is inconclusive and does not mark the grocery item as being close to expiration. The precise threshold used in determining whether a grocery item is close to expiration may be item specific and may depend on the average inventory level of the item and the turnaround rate of the item.

Whether a batch of grocery item is close to expiration may be based on one or more rules defined by the online concierge system 140. For example, the online concierge system 140 may define a threshold period approaching the expiration date (e.g., N days before the expiration). If the online concierge system 140 detects that instances of the grocery items that were checked out are being within a predetermined time period of an expiration date, the online concierge system 140 may determine that the rest of the batch remaining in the inventory is close to expiration. The threshold period may be the same or different for different kinds of the grocery items. For example, items that are easier to spoil (e.g., milk, sushi) may have a different threshold than canned foods or packaged foods. The online concierge system 140 may also take into account of other factors such as the item turn around rate, type of packages, inventory level to determine whether the batch of grocery item should be marked as close to expiration.

The data store 240 of the online concierge system 140 may include an item-store pair data entry that is used to save the data related to the grocery item in a particular physical store. The online concierge system 140 may mark the grocery item as "Close to expiry" in data store 240. The "expiry" attribute may take the form of a DateTime store in the store product table in which a row is specific to a specific product at a specific store.

The online concierge system 140 generates 340 one or more item-specific suggestions associated with the expiration information with respect to the grocery item offered in the physical store. The online concierge system 140 causes 350 a graphical user interface to display the one or more item-specific suggestions. The suggestions may include making changes to the application provided by the online concierge system 140, making suggestions to the physical store, and making other inventory planning actions.

For example, upon determining that a batch of the grocery item offered in the physical store is close to expiration, the online concierge system 140 may make a change to the ordering interface for the customers who shop for the items. In some embodiments, the online concierge system 140 may generate a notification for the customer device linked to the order. The notification may offer substitution options for the item that is close to expiration and/or may offer the grocery item to the customer's next order since the customer may want to rebuy the item soon if the item is expiring. For example, for a customer who adds an expiring item to the cart, the ordering interface may indicate that the physical store has the grocery item, but the grocery item is close to expiry and may prompt the customer to decide whether substitute the grocery item with another item.

The online concierge system 140 may also provide price adjustments to the expiring grocery items. For example, the online concierge system 140 may notify the user on the ordering interface that a grocery item is close to expiry and offer a discount to help the physical store to clear the item out to reduce food waste. In some embodiments, a customer may opt-in to receive notifications for close-to-expiry items. Those notifications would alert the customer to deals around expiring items that the user could make use of to save money and reduce food waste. The online concierge system 140 may also determine the discount to give based on the expiration date.

In some embodiments, other vendors may promote their products if a grocery item is running low on stock and is close to expiration. The 140 may sell the suggested replacement (of a competitor vendor) as a new impression slot. In some embodiments, a competitor vendor may pay for a sponsored nudge, specifically for the customer to try a grocery item and the nudge would be sent close to the expiry. This new item discovery impression slot could also be that a vendor could pay for a rate/review product nudge/notification. This review could feed back into the demographic advertisement data of the online concierge system 140 and also provide insight to the vendor.

In some embodiments, the online concierge system 140, upon determining the expiration information, may provide a suggestion to the physical store to adjust its inventory. For example, the online concierge system 140 may suggest the physical store lower the price for the expiring grocery item. The online concierge system 140 may also suggest the physical store move the expiring grocery item to a more prominent position in the store to promote the sale of the item. The online concierge system 140 may further remind the physical store to restock the expiring grocery item as the store may need to replenish newer instances of the item to replace the expiring batch. Other suggestions and notifications to the physical store are also possible.

In some embodiments, the online concierge system 140, upon determination of the expiration information, may also take actions related to inventory planning. In some embodiments, the online concierge system 140 determines that a customer has just purchased an expiring grocery item despite a warning notification. The application of the online concierge system 140 may prompt recipes that use large quantities of the expiring grocery item so that the customer may consume the expiring grocery item quickly. In some embodiments, the online concierge system 140 may also determine the restocking information of the grocery item. The machine learning model that is used to determine expiration information may also be used to predict re-stocking dates. The machine learning model may predict the next fresh date (based on past re-stocking dates noticed through cameras that capture multi-angle images of the grocery item. Alternatively or additionally, the machine learning model may in real-time determine that a new batch of items has been stocked (e.g., 2 or more instances of the grocery item with new expiration information are detected). In turn, the online concierge system 140 may mark the item as "Fresh" within the system provided by the online concierge system 140 such as the ordering interface.

In some embodiments, the online concierge system 140 may generate one or more item-specific suggestions associated with the expiration information with respect to the grocery item by applying a machine learning model to generate the item-specific suggestions. As the online concierge system 140 provides notifications to customers regarding expiration information, the online concierge system 140 may monitor the actions taken by the customers in response to receiving the expiration notifications. For example, the customers may decide to substitute the expiring item, purchase additional expiring items due to a discount, or ignore the recommendations or other actions taken by the online concierge system 140. The online concierge system 140 may collect those actions by the customers and train the machine learning based on those training samples to generate a model that makes better suggestions based on users' historical actions.

The online concierge system 140 may also generate training samples for the machine learning model that is used to determine expiration information from the multi-angle images. For example, the online concierge system 140, upon determining that a grocery item being checked out is close to expiration, may prompt the customer or the picker to manually verify the expiration information. If the determined expiration information matches the manual verification, the multi-angle images of the grocery item may serve as a positive training sample that has known expiration information. If the determined expiration information does not match the manual verification, the multi-angle images of the grocery item may serve as a negative training sample. The manual verification may also allow a customer or picker to provide the brand, packaging type, and type of grocery item. Those may also serve as training labels in training various machine learning models.

In various embodiments, a wide variety of machine learning techniques may be used to determine the grocery item and the expiration information on the grocery item. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used.

In various embodiments, the training techniques for a machine learning model may be supervised, semi-supervised, or unsupervised. In supervised learning, the machine learning models may be trained with a set of training samples that are labeled. For example, for a machine learning model trained to determine expiration information, the training samples may include one or more multi-angle images of grocery items with known expiration information. The labels for each training sample may be binary or multi-class. The label may be the expiration date of an item or a label for the type of the item. In some cases, an unsupervised learning technique may be used. The samples used in training are not labeled. Various unsupervised learning techniques such as clustering may be used. In some cases, the training may be semi-supervised with a training set that has a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In determining expiration information, the objective function of the machine learning algorithm may be the training error rate in predicting the expiration date compared to the expiration date. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the sum of absolute differences between the predicted values and the actual value), L2 loss (e.g., the sum of squared distances).

Figure 4:
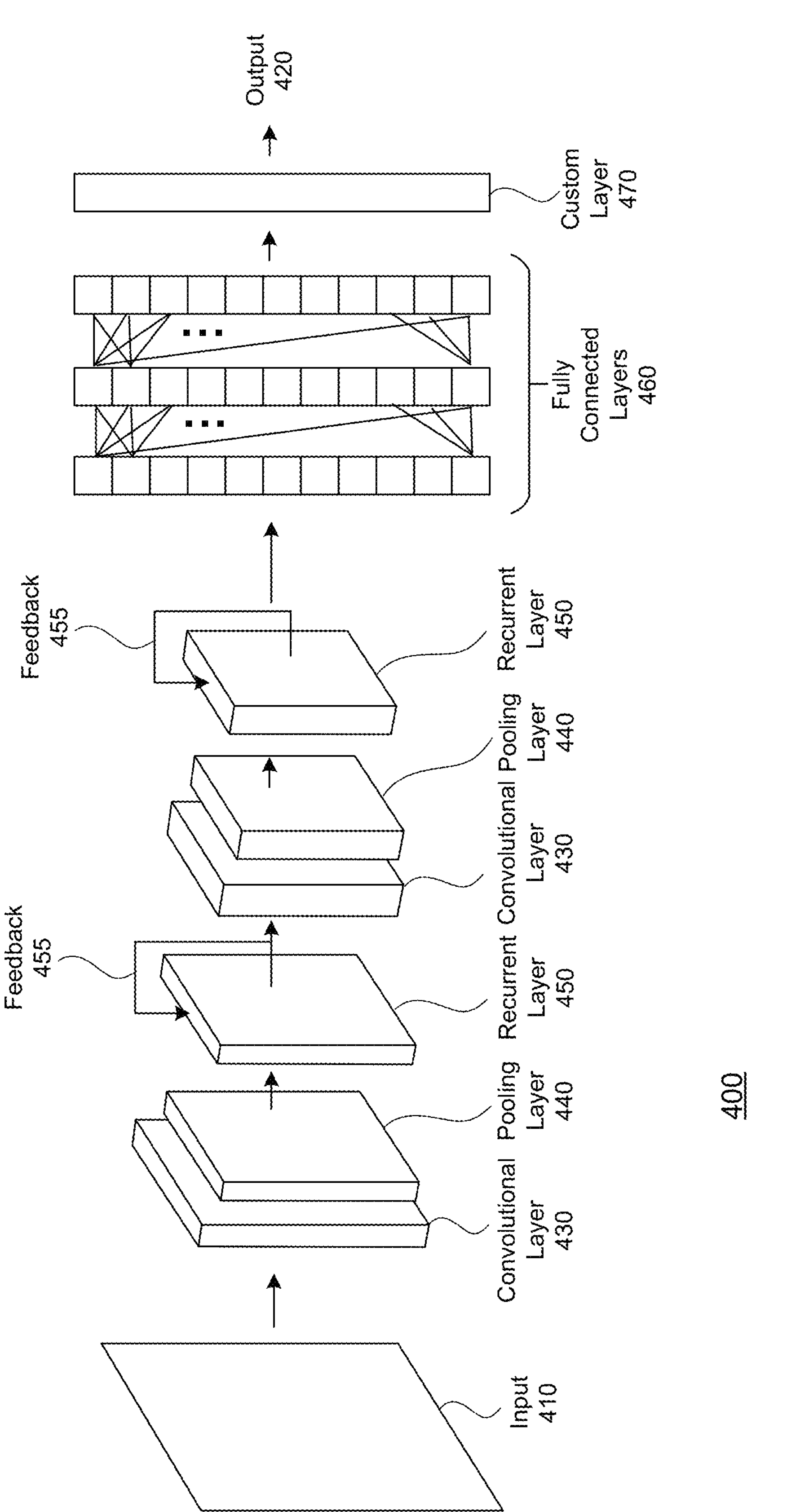
FIG. 4 is a block diagram illustrating a structure of an example machine learning model, in accordance with one or more embodiments.

Referring to FIG. 4, a structure of an example CNN is illustrated, according to one or more embodiments. The CNN 400 may receive an input 410 and generate an output 420. The input may be multi-angle images of the grocery item. The CNN 400 may include different kinds of layers, such as convolutional layers 430, pooling layers 440, recurrent layers 450, full connected layers 460, and custom layers 470. A convolutional layer 430 convolves the input of the layer with one or more kernels to generate different types of data that are filtered by the kernels to generate feature maps. Each convolution result may be associated with an activation function. A convolutional layer 430 may be followed by a pooling layer 440 that selects the maximum value (max pooling) or average value (average pooling) from the portion of the input covered by the kernel size. The pooling layer 440 reduces the spatial size of the extracted features. In some embodiments, a pair of convolutional layer 430 and pooling layer 440 may be followed by a recurrent layer 450 that includes one or more feedback loops 455. The feedback loops 455 may be used to account for spatial relationships of the features in an image or temporal relationships of the objects in the image. The layers 430, 440, and 450 may be followed by multiple fully connected layers 460 that have nodes (represented by squares in FIG. 4) connected to each other. The fully connected layers 460 may be used for classification and object detection. In one or more embodiments, one or more custom layers 470 may also be presented for the generation of a specific format of output 420.

The order of layers and the number of layers of the CNN 400 in FIG. 4 is for example only. In various embodiments, a CNN 400 includes one or more convolutional layer 430 but may or may not include any pooling layer 440 or recurrent layer 450. If a pooling layer 440 is present, not all convolutional layers 430 are always followed by a pooling layer 440. A recurrent layer may also be positioned differently at other locations of the CNN. For each convolutional layer 430, the sizes of kernels (e.g., 3×3, 5×5, 7×7, etc.) and the numbers of kernels allowed to be learned may be different from other convolutional layers 430. While the structure of a neural network is shown, other machine learning models discussed above may also be used.

A machine learning model may include certain layers, nodes, kernels and/or coefficients. Training of a neural network, such as the CNN 400, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other training samples in the training sets to compute the value of the objective function in a particular training iteration. In turn, the neural network performs backpropagation by using gradient descent such as stochastic gradient descent (SGD) to adjust the coefficients in various functions to improve the value of the objective function.

Multiple iterations of forward propagation and backpropagation may be performed. Training may be completed when the objective function has become sufficiently stable (e.g., the machine learning model has converged) or after a predetermined number of rounds for a particular set of training samples. The trained machine learning model may be used for determining expiration information.

Figure 5:
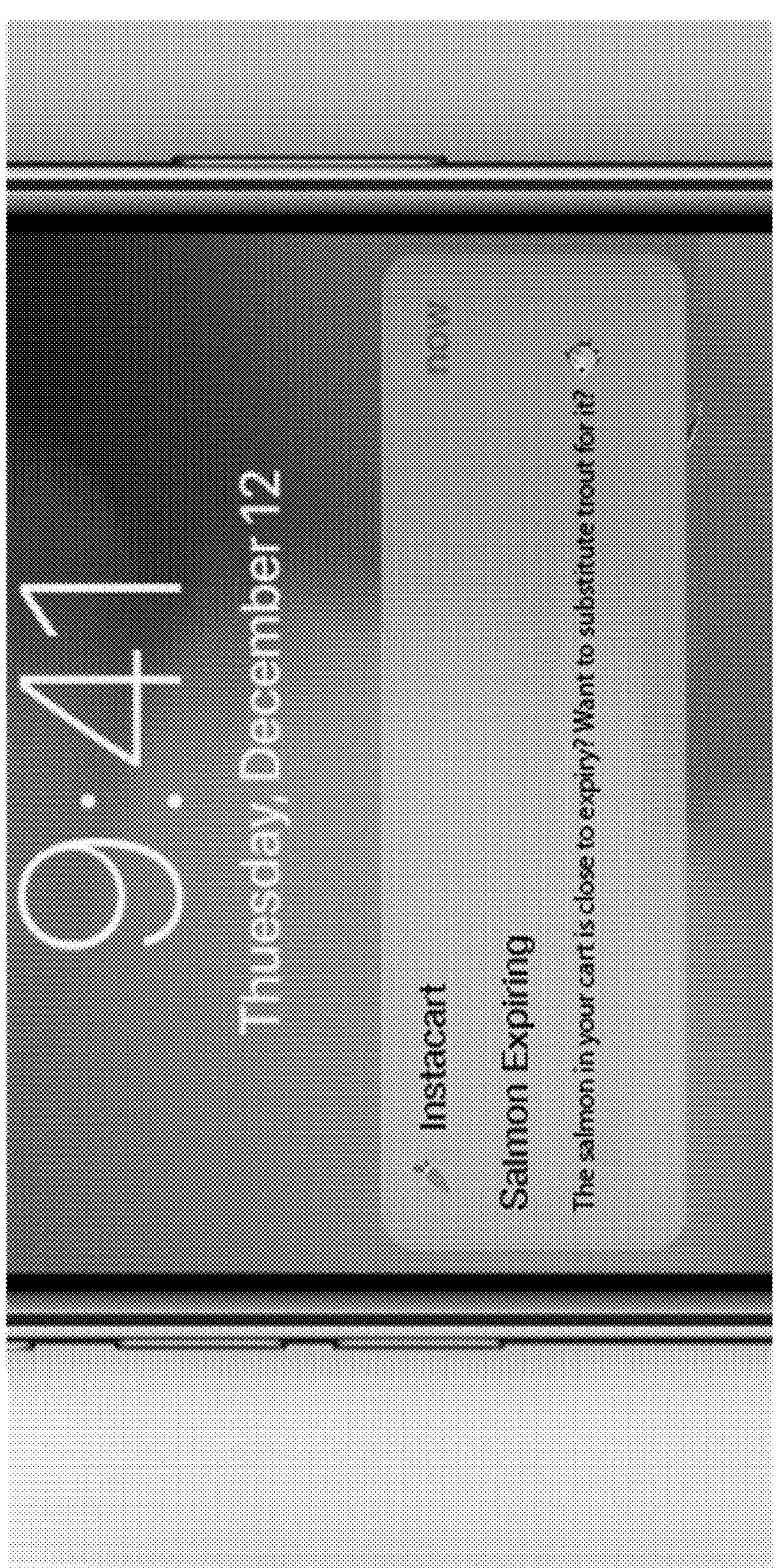
FIG. 5 is a conceptual diagram illustrating a notification sent from the online concierge system to a customer based on the determined expiration information, in accordance with one or more embodiments.

FIG. 5 is a conceptual diagram illustrating a notification sent from the online concierge system 140 to a customer based on the determined expiration information, in accordance with some embodiments. The customer may order a grocery item (e.g., salmon) through the ordering interface of the online concierge system 140 and a picker may be retained to collect the grocery item. Images of other instances of the grocery item may be captured from shopping carriers or at the checkout counters. The online concierge system 140 determines that the batch of the grocery item (e.g., the batch of salmon that is packed at the same time) is close to expiration. The online concierge system 140 may send a notification to the customer to ask if the customer wants to substitute the expiring grocery item with another grocery item.

Figure 6:
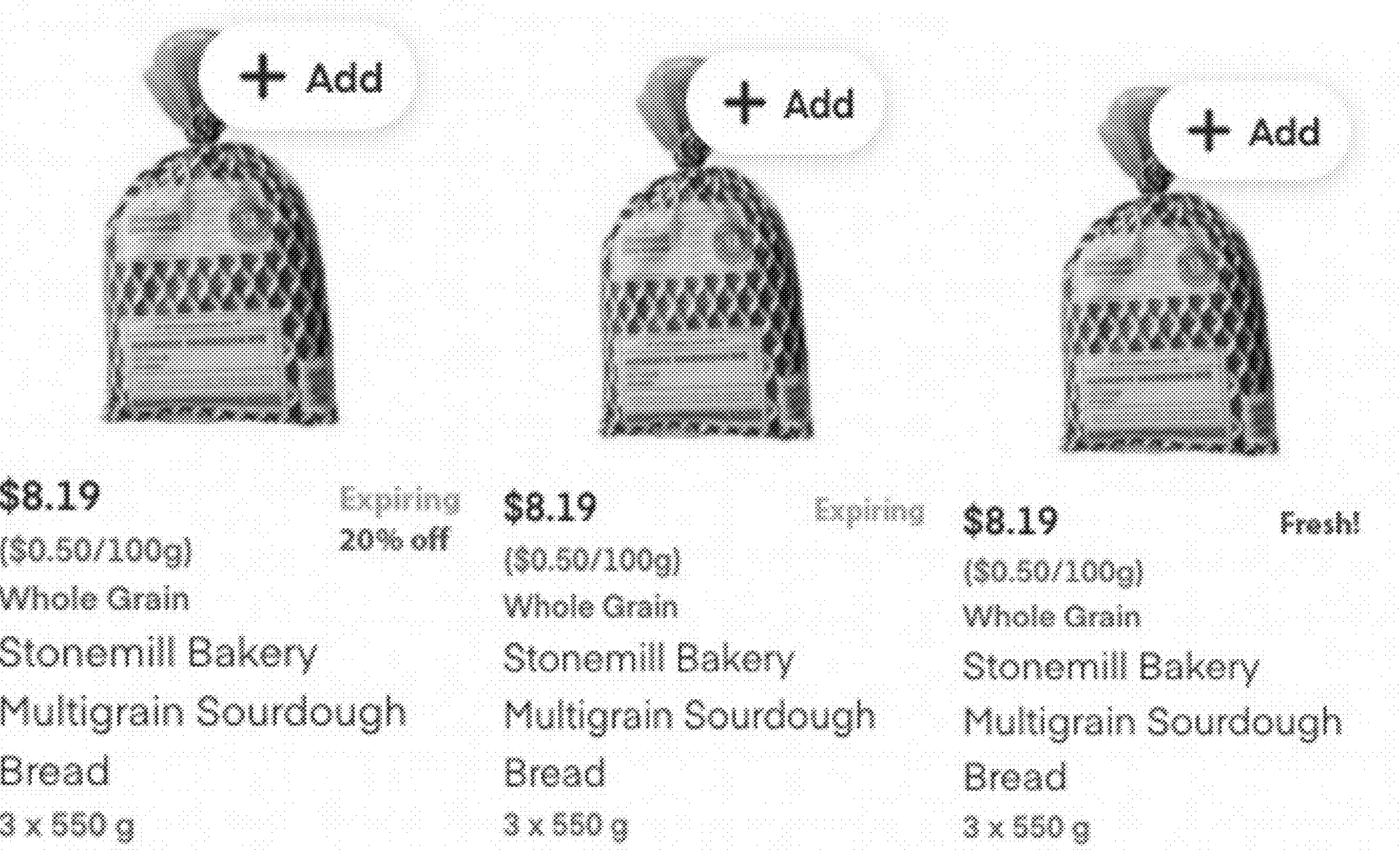
FIG. 6 is a conceptual diagram illustrating an example ordering interface of online concierge system 140, in accordance with one or more embodiments.

FIG. 6 is a conceptual diagram illustrating an example ordering interface of online concierge system 140, in accordance with some embodiments. The ordering interface may show different batches of the same grocery items and have different tags indicating the freshness or expiry of the batch. For some of the expiring batches, the ordering interface may provide a discount such as 20% off. The online concierge system 140 may also use the process 300 to determine the restocking date of the grocery batch and mark a new batch of the grocery item as "fresh." The customers are allowed to select a different batch based on their preferences.

Figure 7:
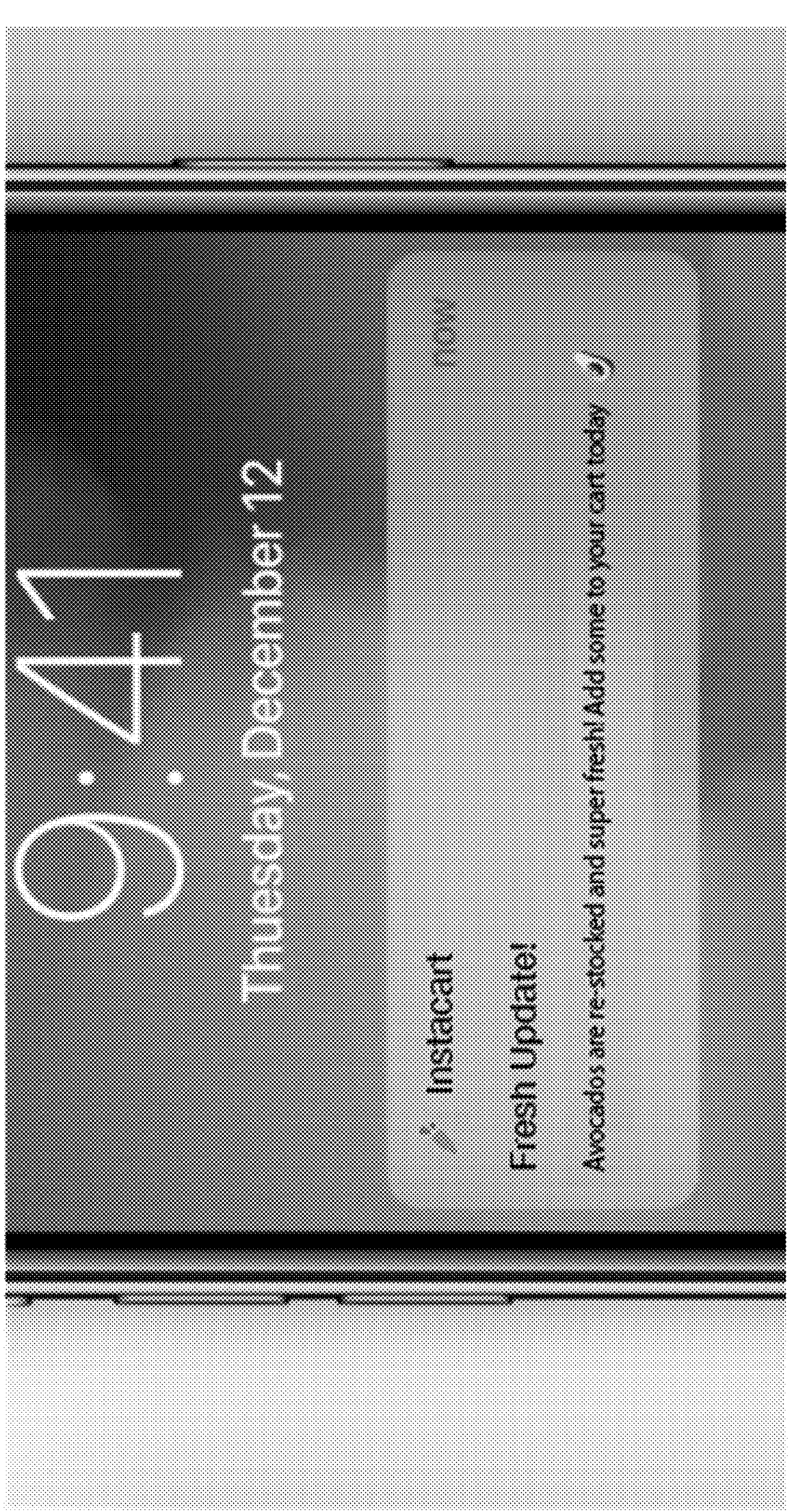
FIG. 7 is a conceptual diagram illustrating a notification sent from the online concierge system to a customer based on the restocking information, in accordance with one or more embodiments.

FIG. 7 is a conceptual diagram illustrating a notification sent from the online concierge system 140 to a customer based on the restocking information, in accordance with some embodiments. The online concierge system 140 may continuously determine the expiration information on various instances of a grocery item. The online concierge system 140 may search for patterns in the change of expiration information. For example, a physical store may have a pattern in that instances of the grocery item have new expiration information every Wednesday. From the pattern the online concierge system 140 may infer that the grocery item is restocked every Wednesday. In some embodiments, the online concierge system 140 may anticipate the restock date and wait for an instance of the grocery item with new expiration information to be captured. After such the instance of the grocery item is captured, the online concierge system 140 may send a freshness notification to customers letting the customers know that a new grocery item has just been re-stocked in the physical store.

ADDITIONAL CONSIDERATIONS

The foregoing description of the embodiments has been presented for the purpose of illustration; a person of ordinary skill in the art would recognize that many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

at a computer system comprising a processor and a computer-readable medium:

causing a plurality of cameras installed at a plurality of physical shopping carriers to capture multi-angle images of a plurality of instances of a grocery item carried at a physical store, wherein the plurality of instances correspond to different instances of a same grocery item from different customers and pickers;

causing additional images of the plurality of instances of the grocery item to be captured at checkout counters equipped with one or more cameras;

receiving the multi-angle images and the additional images of the plurality of instances of the grocery item;

applying a machine learning model to the multi-angle images to identify expiration dates of the plurality of instances of the grocery item, wherein the machine learning model is trained by:

inputting, in a forward propagation, training samples of multi-angle images of items with known expiration dates to the machine learning model, generating predicted expiration dates of the items in the training samples using the machine learning model, determining a result of an objective function that compares the predicted expiration dates with the known expiration dates, and adjusting, in a back propagation, parameters of the machine learning model based on the result of the objective function;

wherein applying the machine learning model comprises identifying placement of location of expiration-date images on packaging and performing optical character recognition on the expiration-date images to identify the expiration dates;

applying repeatedly the machine learning model for additional instances of the grocery item for a plurality of instances of expiration dates that are recognized from the expiration-date images;

determining, based on the plurality of instances of expiration dates, that the plurality of instances of the grocery item have a same expiration date or different expiration dates;

determining that the plurality of instances of the grocery item having the same expiration date exceeds a threshold;

determining, based on that the plurality of instances of the grocery item having the same expiration date exceeding the threshold, that the batch of the grocery item remaining in inventory of the physical store share the expiration date that is close to expiration;

generating, responsive to determining that the batch of the grocery item remaining in inventory of the physical store is close to expiration, one or more item-specific suggestions associated with the batch of the grocery item remaining in inventory; and causing a graphical user interface to display the one or more item-specific suggestions.

2. The method of claim 1, wherein receiving the multi-angle images of the plurality of instances of the grocery item carried out at the physical store comprises receiving one or more images from a physical shopping carrier that is equipped with one or more cameras that capture the one or more images.

3. The method of claim 1, wherein receiving the multi-angle images of the plurality of instances of the grocery item carried out at the physical store comprises receiving one or more images from a checkout counter that is equipped with one or more cameras that capture the one or more images.

4. The method of claim 1, wherein the machine learning model is a multi-stage model that identifies a type of the grocery item and applies an item-specific image recognition model to identify the expiration dates.

5. The method of claim 1, wherein the machine learning model comprises a convolutional neural network.

6. The method of claim 1, wherein generating the one or more item-specific suggestions associated with the expiration date with respect to the grocery item comprises applying a second machine learning model to generate the one or more item-specific suggestions.

7. The method of claim 1, wherein generating the one or more item-specific suggestions comprises displaying, at a graphical user interface, a suggestion to a user to replace the grocery item with another item.

8. The method of claim 1, wherein generating the one or more item-specific suggestions comprises displaying, at a graphical user interface, a suggestion to mark the grocery item associated with the physical store as expiring.

9. The method of claim 1, wherein generating the one or more item-specific suggestions comprises suggesting to the physical store to change price of the grocery item.

10. The method of claim 1, further comprising:
determining restocking information of the grocery item based on the expiration date; and
causing to display, at the graphical user interface, the restock information of another batch of the grocery item that is recently restocked.

11. A non-transitory computer-readable medium configured to store code comprising instructions, the instructions, when executed by a processor, cause the processor to:
cause a plurality of cameras installed at a plurality of physical shopping carriers to capture multi-angle images of a plurality of instances of a grocery item carried at a physical store, wherein the plurality of instances correspond to different instances of a same grocery item from different customers and pickers;
cause additional images of the plurality of instances of the grocery item to be captured at checkout counters equipped with one or more cameras;
receive the multi-angle images and the additional images of the plurality of instances of the grocery item;
apply a machine learning model to the multi-angle images to identify expiration dates of the plurality of instances of the grocery item, wherein the machine learning model is trained by:
inputting, in a forward propagation, training samples of multi-angle images of items with known expiration dates to the machine learning model,
generating predicted expiration dates of the items in the training samples using the machine learning model,
determining a result of an objective function that compares the predicted expiration dates with the known expiration dates, and
adjusting, in a back propagation, parameters of the machine learning model based on the result of the objective function;
wherein applying the machine learning model comprises identifying placement of location of expiration-date images on packaging and performing optical character recognition on the expiration-date images to identify the expiration dates;
apply repeatedly the machine learning model for additional instances of the grocery item for a plurality of instances of expiration dates that are recognized from the expiration-date images;
determine, based on the plurality of instances of expiration dates, that the plurality of instances of the grocery item have a same expiration date or different expiration dates;
determine that the plurality of instances of the grocery item having the same expiration date exceeds a threshold;
determine, based on that the plurality of instances of the grocery item having the same expiration date exceeding the threshold, that the batch of the grocery item remaining in inventory of the physical store share the expiration date that is close to expiration;
generating, responsive to determining that the batch of the grocery item remaining in inventory of the physical store is close to expiration, one or more item-specific suggestions associated with the batch of the grocery item remaining in inventory; and
cause a graphical user interface to display the one or more item-specific suggestions.

12. The non-transitory computer-readable medium of claim 11, wherein receiving the multi-angle images of the plurality of instances of the grocery item carried out at the physical store comprises receiving one or more images from a shopping carrier that is equipped with one or more cameras that capture the one or more images.

13. The non-transitory computer-readable medium of claim 11, wherein receiving the multi-angle images of the plurality of instances of the grocery item carried out at the physical store comprises receiving one or more images from a checkout counter that is equipped with one or more cameras that capture the one or more images.

14. The non-transitory computer-readable medium of claim 11, wherein the machine learning model is a multi-stage model that identifies a type of the grocery item and applies an item-specific image recognition model to identify the expiration dates.

15. The non-transitory computer-readable medium of claim 11, wherein the machine learning model comprises a convolutional neural network.

16. A system comprising:
one or more cameras configured to capture multi-angle images of a plurality of instances of a grocery item carried at a physical store; and
a computing server comprising a processor and memory, the memory configured to store code comprising instructions, wherein the instructions, when executed by the processor, cause the processor to:
cause a plurality of cameras installed at a plurality of physical shopping carriers to capture multi-angle images of a plurality of instances of a grocery item carried at a physical store, wherein the plurality of instances correspond to different instances of a same grocery item from different customers and pickers;
cause additional images of the plurality of instances of the grocery item to be captured at checkout counters equipped with one or more cameras;
receive the multi-angle images and the additional images of the plurality of instances of the grocery item;
apply a machine learning model to the multi-angle images to identify expiration dates of the plurality of instances of the grocery item, wherein the machine learning model is trained by:
inputting, in a forward propagation, training samples of multi-angle images of items with known expiration dates to the machine learning model,
generating predicted expiration dates of the items in the training samples using the machine learning model,
determining a result of an objective function that compares the predicted expiration dates with the known expiration dates, and adjusting, in a back propagation, parameters of the machine learning model based on the result of the objective function;

wherein applying the machine learning model comprises identifying placement of location of expiration-date images on packaging and performing optical character recognition on the expiration-date images to identify the expiration dates;

apply repeatedly the machine learning model for additional instances of the grocery item for a plurality of instances of expiration dates that are recognized from the expiration-date images;

determine, based on the plurality of instances of expiration dates, that the plurality of instances of the grocery item have a same expiration date or different expiration dates;

determine that the plurality of instances of the grocery item having the same expiration date exceeds a threshold;

determine, based on that the plurality of instances of the grocery item having the same expiration date exceeding the threshold, that the batch of the grocery item remaining in inventory of the physical store share the expiration date that is close to expiration;

generating, responsive to determining that the batch of the grocery item remaining in inventory of the physical store is close to expiration, one or more item-specific suggestions associated with the batch of the grocery item remaining in inventory; and cause a graphical user interface to display the one or more item-specific suggestions.

* * * * *